No. 782,266. PATENTED FEB. 14, 1905.
J. W. POINCE.
NUT LOCK.
APPLICATION FILED NOV. 14, 1904.
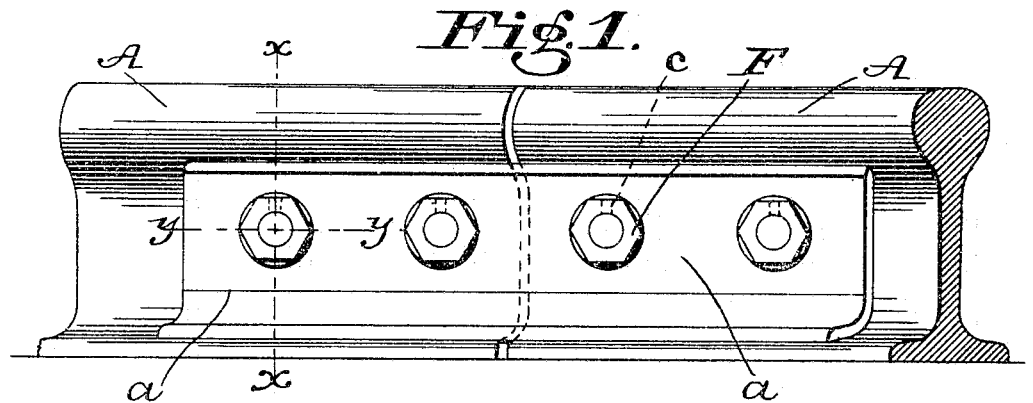
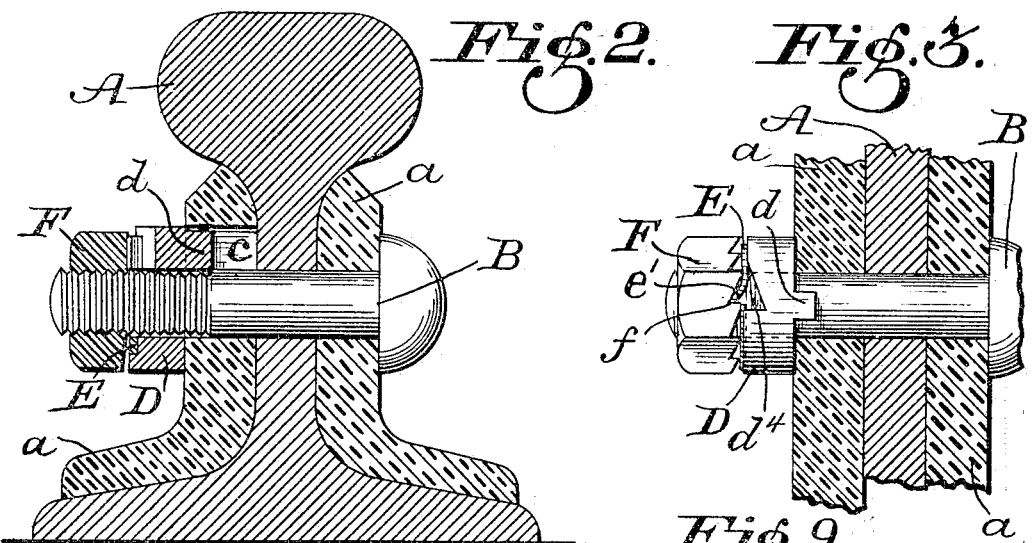
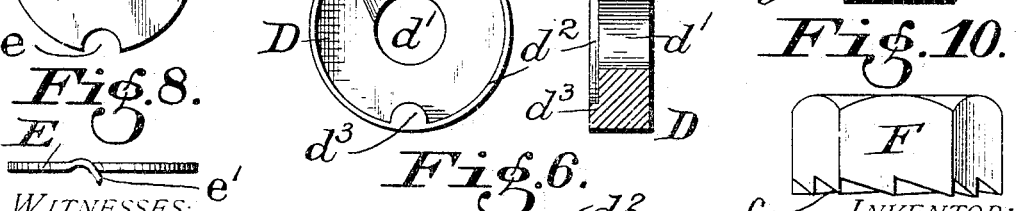
WITNESSES:
Anna K. Burnham.
Tracy E. O'Brien.
INVENTOR:
John W. Poince,
BY Frank M. Burnham
Attorney.

No. 782,266.  Patented February 14, 1905.

UNITED STATES PATENT OFFICE.

JOHN W. POINCE, OF DAYTON, OHIO.

NUT-LOCK.

SPECIFICATION forming part of Letters Patent No. 782,266, dated February 14, 1905.

Application filed November 14, 1904. Serial No. 232,713.

*To all whom it may concern:*

Be it known that I, JOHN W. POINCE, a citizen of the United States, residing at Dayton, in the county of Montgomery and State of Ohio, have invented certain new and useful Improvements in Nut-Locks; and I do hereby declare the following to be a full, clear, and exact description of the invention, such as will enable all others as well as those skilled in the art to which it appertains to make and use the same, reference being had to the accompanying drawings, and to the letters of reference marked thereon, which form a part of this specification.

My invention relates (referring to the same in general terms) to means for securing or attaching one short plate or piece over the joint or junction of the abutting ends of two sections in splicing or connecting them together; or, more directly and succinctly stated, this invention relates to improvements in that class of invention commonly known as "nut-locks;" and although my nut-lock may be used generally and wherever it is desired to employ bolts in connecting large timbers or sections of different elements together, as in bridge and machine construction, it is more especially designed and intended for use in connecting or joining together the sections of rails in a railway or car track, for which purpose it is herein illustrated and described; and the principal objects consist in providing means whereby an ordinary bolt may be provided with my invention, thus preventing the removal and loss of the nut and the consequential disconnection of the parts, no matter how great the jarring, jolting, or friction of the parts may be.

My improved nut-lock may be readily and quickly placed in position or removed, is simple in construction, and composed of few parts, inexpensive in cost of manufacture, and positive and effective in its results.

My invention consists, essentially, referring in general terms to the construction of my improved nut-lock, of the bolt, the large washer, the small washer or annular pawl, and the nut or ratchet, and the novel arrangement and combination of these parts, as fully brought out in the accompanying illustrations, taken in connection with the following detailed description, and set up in the subjoined claims, in accordance with the statutes in such cases made and provided therefor.

Referring to the annexed drawings, illustrating my invention, and in which the same letters refer to like parts wherever occurring throughout the several views, Figure 1 is a general view of my improved nut-lock as employed in coupling two sections of car-rails, thus illustrating the practical application of my invention. Fig. 2 is a transverse sectional view taken on line X X of Fig. 1, but on a slightly-enlarged scale therefrom. Fig. 3 is a broken-away longitudinal sectional view on line Y Y of Fig. 1, but on a slightly-enlarged scale therefrom. Figs. 4, 5, and 6 are respectively plan, vertical sectional, and side views of the large washer. Figs. 7 and 8 are plan and side views, respectively, of the small washer or pawl; and Figs. 9 and 10 are plan and side views, respectively, of the nut or ratchet.

In describing my said invention and referring in detail to the various parts or mechanical elements or features of construction which make up my improved nut-lock by means of the letters of reference, as aforesaid, A refers to the two abutting sections of rails or members to be joined or spliced together. $a$ represents the fish-plates covering the joints formed by the abutting ends of said rails, said rails and fish-plates being provided with smooth openings or eyes, each adapted to receive the shank of an ordinary bolt B in the usual manner, the eyes of the outer fish-plate being formed or continued at the upper side into a recess or slot $c$, (see Fig. 2 and dotted lines Fig. 1,) which receives lug $d$ of large washer D and prevents said large washer from moving or rotating upon the shank of said bolt, which it loosely encircles when its eye $d'$ is passed over said shank. Large washer D is formed on the outer face with a vertical flange $d^2$, which has an offset $d^3$, and said washer is further provided with a cut-away or concavity $d^4$, as is more particularly shown in Figs. 4, 5, and 6, thus permitting of small washer or annular pawl E, which is provided with a smooth eye, so as to encircle the bolt-shank, to rest therein just flush with the top thereof when in position, when semicircular recess $e$ will fit over and around offset $d^3$ of said large washer and projecting end of $e'$ of said small washer, which is cut through at this point and is sufficiently resilient so that when pressed in removing the nut it will have a springing movement in concavity $d^4$ of the large washer, over which it rests when the parts are assembled in operative position and as shown more particularly in Fig. 3 of the drawings, and will act as a pawl by engaging the ratchet-teeth $f$ on inner face of nut or ratchet F and prevent said nut, no matter how great may be the jar, from being worked or turned off the shank of the bolt until desired, said nut having an ordinary screw-threaded eye or opening $f'$ the screw-threads of which will engage the screw-threads on shank of said bolt in the usual well-known manner, and thus positively locking said nut and retaining the parts and the abutting ends of the rails in position.

I am well aware that it is not broadly new in a nut-lock to employ a nut formed with ratchet-teeth which engage a pawl, but that several valid patents have heretofore been granted setting up new and legitimate combination of elements, among which were ratchet-teeth and a pawl which engaged the same. Therefore

What I claim is—

1. The combination in a nut-lock, of the bolt; a washer having a flange formed with an offset, a concavity and a lug; another washer adapted to act as a pawl, and rest within the flange of and engage the offset of, said first washer; and a nut upon the shank of said bolt adapted to engage said pawl; all substantially as and for the purposes described.

2. The combination with a fish-plate provided with a recess; of a bolt; a large washer formed with means to rest in said recess, and provided with a flange and offset, and a concavity; a small washer formed with a resilient pawl; and a nut provided with ratchet-teeth; substantially as described.

3. In a nut-lock, the combination with the fish-plates, one of which has the bolt-eyes continued in a recess; of the bolt; a large washer provided with means to rest in said recess, and having a flange formed with an offset, and a concavity; a small washer formed with a recess and a pawl; and a nut adapted to act as a ratchet; substantially as described.

In testimony whereof I have affixed my signature in presence of two witnesses.

JOHN W. POINCE.

Witnesses:
TRACY E. O'BRIEN,
JAMES O. HARTSHORN.